United States Patent [19]
Delloye et al.

[11] Patent Number: 5,192,443
[45] Date of Patent: Mar. 9, 1993

[54] SEPARATION OF RARE EARTH VALUES BY LIQUID/LIQUID EXTRACTION

[75] Inventors: Thierry Delloye, Villeparisis; Jean-Louis Sabot, Maisons Laffitte, both of France

[73] Assignee: Rhone-Poulenc Chimie, Courbevoie, France

[21] Appl. No.: 657,957

[22] Filed: Feb. 21, 1991

Related U.S. Application Data

[63] Continuation of Ser. No. 172,423, Mar. 23, 1988, abandoned.

[30] Foreign Application Priority Data

Mar. 23, 1987 [FR] France ................. 87 03959

[51] Int. Cl.$^5$ .............................................. B01D 11/04
[52] U.S. Cl. ..................................... 210/634; 423/21.5
[58] Field of Search ............... 210/634, 638; 423/21.5, 423/49, 139, 716.14

[56] References Cited

U.S. PATENT DOCUMENTS

| | | | |
|---|---|---|---|
| 3,658,486 | 4/1972 | Goto | 423/21.5 |
| 4,212,849 | 7/1980 | Lucid et al. | 423/21.5 X |
| 4,599,153 | 7/1986 | Bright | 423/49 X |
| 4,617,125 | 10/1986 | Danesi | 210/643 X |
| 4,647,438 | 3/1987 | Sabot et al. | 423/21.5 |

FOREIGN PATENT DOCUMENTS 0156735 10/1985 European Pat. Off. .

OTHER PUBLICATIONS

Nikolaev et al, "Extraction of some actinides from nitrate and sulfate solution by methylbis(alkoxymethyl)-phosphine oxides", Chemical *Abstracts*, No. 85123f, vol. 71 (1969), p. 323.
Mikhailichenko et al, "Extraction of rare earth nitrates by neutral organophosphorus extractants" Chemical Abstracts, Abstract No. 129741c, vol. 79 (1973), p. 220.
Mikhailichenko et al, "Extraction of rare earth elements by triisoamylphosphine oxide from nitrate solutions", Chemical Abstracts, Abstract No. 66203p, vol. 83 (1975), p. 505.
Korpusov et al, "Study of the extraction of rare earth elements, americium, and curium from nitrate media using tri-1-methylheptylphosphine oxide", *Chemical Abstracts*, Abstract No. 15379h, vol. 92 (1980), p. 457.
Mikhailichenko et al, "Extraction of rare earth metals using a mixture of trioctylmethylammonium nitrate and trialkylphosphine oxide", Chemical *Abstracts*, Abstract No. 95135p, vol. 101 (1984), p. 250.

*Primary Examiner*—Frank Spear
*Attorney, Agent, or Firm*—Burns, Doane, Swecker & Mathis

[57] ABSTRACT

The rare earth values contained in an aqueous solution of the nitrates of at least two rare earth elements are conveniently separated by first liquid/liquid extracting such aqueous nitrate solution with a liquid organic phase containing at least two $P(O)R_1R_2R_3$/-$P(O)R_4R_5R_6$ organophosphorus extractants.

36 Claims, 1 Drawing Sheet

SEPARATION OF RARE EARTH VALUES BY LIQUID/LIQUID EXTRACTION

This application is a continuation of application Ser. No. 07/172,423, filed Mar. 23, 1988, now abandoned.

BACKGROUND OF THE INVENTION

1. Field of the Invention

The present invention relates to the solvent separation of rare earth elements contained in aqueous solutions thereof, and more especially, relates to the separation, by liquid/liquid extraction, of the rare earth elements contained in aqueous solutions of the nitrates thereof.

By the expression "rare earths" according to this invention are intended the rare earth elements designated the lanthanides having atomic numbers of 57 to 71, inclusive, and yttrium, having an atomic number of 39.

In the following description of the present invention, the term "ceric rare earths" connotes the lightest elements of the rare earths, beginning with lanthanum and extending to neodymium in accordance with their atomic numbers, and the term "yttric rare earths" connotes the heaviest rare earth elements, beginning with samarium and ending with lutecium, and also comprising yttrium.

2. Description of the Prior Art

It is known to this art that the rare earths are difficult to separate in view of the fact that the differences in the properties of one rare earth relative to those of its neighbors are extremely slight.

For the separation of these very closely related elements, certain processes have been developed which have become particularly important in the separation of rare earths, i.e., the liquid/liquid extraction processes. These are based on the selective extraction of one of the rare earths from a mixed solution thereof, utilizing a solvent of extraction which is not miscible therewith.

As the extraction solvent, certain organic phosphorus compounds in solution in an organic diluent are known to this art as being useful for the separation of the rare earths from each other. In particular, it is known to thus use tri-n-octylphosphine oxide, designated TOPO.

However, TOPO is in the solid state at ambient temperature and, due to its limited solubility in the usual kerosene solvents, its use is not advisable for certain applications, in particular for the separation of rare earths in a nitrate medium and in concentrated solution.

Furthermore, certain separations, for example yttrium from other yttric rare earths, are difficult to carry out in view of their greater similarity of properties and also due to the fact that, under the conditions of the industrial decomposition of the rare earth minerals, yttrium is in the presence of relatively large amounts of yttric rare earths, which obviously is related to the composition of the rare earth mineral.

SUMMARY OF THE INVENTION

Accordingly, a major object of the present invention is the provision of an improvedly selective process for the separation of the rare earth elements which conspicuously ameliorates those disadvantages and drawbacks to date characterizing the state of this art.

Briefly, the present invention features the separation of rare earth values contained in an aqueous solution of at least two of the rare earths, by liquid/liquid extraction between an aqueous phase containing the rare earth nitrates to be separated and an organic phase containing at least two organophosphorus extractants, said extractants comprising a mixture of organic phosphorus compounds having the formulae (I) and (I'):

(I)

(I')

wherein formula (I), $R_1$, $R_2$ and $R_3$, which may be identical or different, are each a hydrogen atom or a substituted or unsubstituted linear or branched chain, or cyclic, saturated or unsaturated hydrocarbon radical, with the proviso that the sum of the carbon atoms of the radicals $R_1$, $R_2$ and $R_3$ is equal to at least 12 carbon atoms; and wherein formula (I'), $R_4$, $R_5$ and $R_6$, which may be identical or different, are each a hydrogen atom or a substituted or unsubstituted linear or branched chain, or cyclic, saturated or unsaturated hydrocarbon radical, also with the proviso that the sum of the number of carbon atoms of the radicals $R_4$, $R_5$ and $R_6$ is equal to at least 12 carbon atoms.

Insofar as the substituted radicals $R_1$, $R_2$, $R_3$, $R_4$, $R_5$ and $R_6$ are concerned, exemplary such substituents are, for example, hydroxy or nitro groups; halogen atoms, in particular chlorine and fluorine; lower alkoxy radicals having from 1 to 4 carbon atoms; cyano groups; and the like.

Each of the radicals $R_1$, $R_2$, $R_3$, $R_4$, $R_5$ and $R_6$ typically contains from 1 to 18 carbon atoms and preferably from 2 to 8 carbon atoms. The total number of carbon atoms in the radicals $R_1$, $R_2$ and $R_3$, or $R_4$, $R_5$ and $R_6$, is at least equal to 12 and preferably is higher than 18.

BRIEF DESCRIPTION OF THE DRAWING

The FIGURE of Drawing is a schematic/diagrammatic illustration of appropriate process/apparatus according to the present invention.

DETAILED DESCRIPTION OF THE PREFERRED EMBODIMENTS OF THE INVENTION

Figure 1:
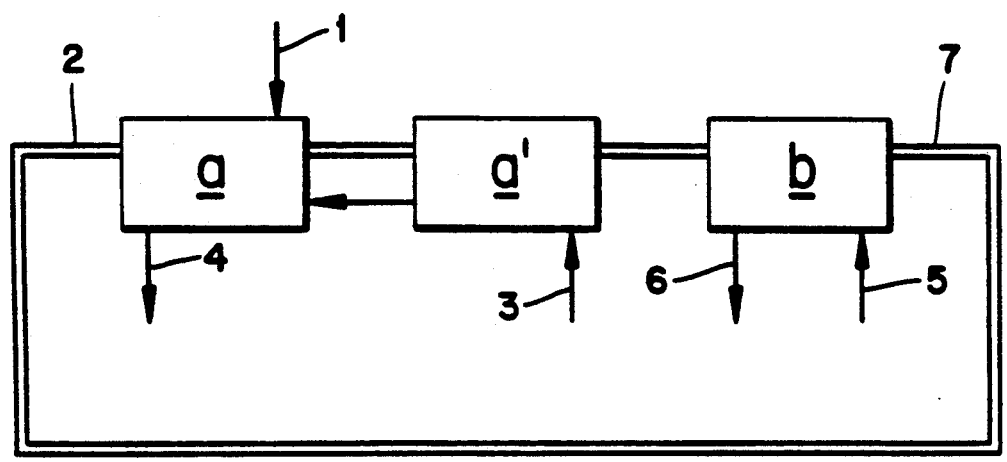

More particularly according to the present invention, exemplary of the radicals $R_1$, $R_2$, $R_3$, $R_4$, $R_5$ and $R_6$, representative are methyl, ethyl, n-propyl, isopropyl, butyl, isobutyl, sec-butyl, tert-butyl, n-pentyl, 1-methylbutyl, isopentyl, tert-pentyl, neo-pentyl, n-hexyl, n-heptyl, n-octyl, n-nonyl, n-decyl, n-undecyl, n-dodecyl, n-tridecyl, n-tetradecyl, n-pentadecyl, n-hexadecyl, n-heptadecyl and n-octadecyl, together with the corresponding branched alkyl radicals and cycloalkyl radicals, in particular the cyclohexyl radical.

That mixture of two extractants especially suitable for use according to the invention comprises one extractant having the formula (I), wherein $R_1$, $R_2$ and $R_3$ are identical linear alkyl radicals, i.e., the $R_1$, $R_2$ and $R_3$ radicals are linear alkyl radicals having the same number of carbon atoms, and one extractant having the formula (I') wherein $R_4$, $R_5$ and $R_6$ are identical linear alkyl radicals, i.e., the $R_4$, $R_5$ and $R_6$ radicals are linear alkyl radicals having the same number of carbon atoms, but the carbon atom content thereof differing from that of the $R_1$, $R_2$ and $R_3$ radicals.

The extractant of formula (I) in which $R_1$, $R_2$ and $R_3$ are identical linear alkyl radicals thus may be admixed with an extractant of formula (I'), in which:

(i) $R_4$, $R_5$ and $R_6$ are identical branched alkyl radicals, i.e., the $R_4$, $R_5$ and $R_6$ radicals are branched alkyl radicals having the same number of carbon atoms;

(ii) $R_4$, $R_5$ and $R_6$ are different branched alkyl radicals, and at least one of such radicals is different from the other two;

(iii) $R_4$, $R_5$ and $R_6$ are linear or branched alkyl radicals, and at least one is a linear alkyl radical and at least one is a branched chain alkyl radical.

The proportion of the two organic phosphorus compounds of formulae (I) and (I') is determined such that a phosphine oxide mixture exists which is liquid at ambient temperature. The mixture obtained is miscible with conventional diluents in all proportions.

Exemplary of a preferred mixture of phosphine oxides according to the invention is a mixture of tri(n-hexyl)phosphine oxide and tri(n-octyl)phosphine oxide, in particular the CYANEX 923 marketed by American Cyanamid.

Another preferred mixture of extraction is CYANEX 925, a mixture of 85% bis(2,4,4-trimethylpentyl)n-octylphosphine and 15% tri(2,4,4-trimethyl)phosphine oxides.

It has now surprisingly been determined that the aforementioned extractants have a very good selectivity relative to the entirety of the rare earths and, in particular, yttrium and the yttric rare earths, specifically gadolinium or lutecium, in contradistinction to the more conventional neutral organic phosphorus compounds, such as, for example, tributyl phosphate.

An application well suited for the process of the invention is a process for the separation of yttrium from the other yttric rare earths with yttrium constituting from 5% to 80% of the total weight of the yttric rare earths (this percentage being expressed by weight of yttrium oxide relative to the weights of the oxides of the yttric rare earths, yttrium included).

Another advantage of the subject extractants is that they enable conducting the extraction in the presence of aqueous phases highly concentrated in rare earth nitrates (more than 300 g/l) and the production of highly concentrated organic phases, containing more than 50 g to 100 g/l, and even more, of the rare earths, expressed in terms of oxide content.

According to the process of the invention, the aqueous phase that is contacted with the extraction agent may be an aqueous solution emanating from the redissolution, by nitric acid, of those hydroxides obtained by sodium hydroxide decomposition of rare earth minerals, such as monazite, bastnaesite and xenotime. Any other solution of rare earths may also be used, after the anion present has been exchanged with the nitrate anion.

The process of the invention may be applied to solutions as such, or after a preliminary concentration.

Generally, the liquid/liquid extraction process is carried out with aqueous solutions of rare earth nitrates having a concentration, expressed in terms of rare earth oxide content, varying from 20 g/l to 500 g/l, with these limits not being critical. Preferably, they have concentrations ranging from 100 g/l to 500 g/l.

Advantageously, they have an acidity ranging from 0.01N to 3.0N.

The organic phase according to the invention optionally contains, in addition to the extractant, an organic diluent. Exemplary diluents are those customarily employed in liquid/liquid extraction operations. Representative are, for example, aliphatic and cycloaliphatic hydrocarbons, for example, hexane, heptane, dodecane, cyclohexane, isoparaffin and petroleum fractions of the kerosene or isoparaffin type; aromatic hydrocarbons such as, for example, benzene, toluene, ethylbenzene, xylene, petroleum fractions consisting of a mixture of alkylbenzenes, in particular fractions of SOLVESSO type (trademark of EXXON); and hydrocarbon halides, such as chloroform, carbon tetrachloride, 1,2-dichloroethylene, monochlorobenzene.

It is also possible to use a mixture of these diluents.

Preferably, an aliphatic hydrocarbon is used.

The extraction power of the organic solution relative to the rare earths increases with increasing concentrations of the organic phosphorus compound in the organic phase. However, the separation factors of the elements relative to each other are not appreciably modified by the concentration of the organic phosphorus compound. Thus, the concentration of the organic phosphorus compound in the organic phase is not a critical factor according to the invention and may vary over wide limits. It may range from 5% by volume of the organic phase, if the extractant is in solution in a diluent, to approximately 100%, if the extractant is used in the pure state.

Preferably, this concentration ranges from 50% to 100% of the volume of the organic phase.

The organic phase may also contain different modifying agents, one of the essential functions of which being to improve the hydrodynamic properties of the system without adversely affecting the extracting properties of the organic phosphorus compounds. Exemplary such modifiers are, in particular, heavy alcohols having from 4 to 15 carbon atoms, and heavy phenols, together with various other compounds such as certain phosphoric esters, for example tributylphosphate. A proportion of from 3% to 20% by volume relative to the organic phase is advantageously selected.

In the selection of the conditions of extraction, the concentration in nitrate ions is important because it can facilitate the extraction of the rare earth or earths to be extracted into the organic phase. Such concentration in nitrate ion advantageously ranges from 1 to 10 moles/liter and preferably from 2 to 9 moles/liter.

If necessary, the nitrate ion concentration may be increased by appropriate additions, for example adding an aqueous solution of nitric acid, an aqueous solution of a nitrate salt, in particular ammonium nitrate.

Over the course of the extraction, the organic phase and the aqueous phase are intimately contacted at a temperature which is not critical; it typically ranges from 10° to 80° C., and preferably from 30° to 60° C.

The ratio of the flow rate of the organic phase to that of the aqueous phase is correlated with the concentration of the extractant and is selected in accordance with the concentration of the rare earths to be extracted in the aqueous phase, utilizing conventional liquid/liquid extraction apparatus.

If certain rare earths are extracted from the organic phase in small quantities, which should have remained in the aqueous phase, it is occasionally necessary to conduct a washing operation after the extraction.

In the washing stage, the organic phase is washed with water, preferably deionized water, or with a dilute aqueous solution of nitric acid or an aqueous solution of rare earth nitrates of the same nature as the rare earths to be extracted, and which may be contained in the fraction of the aqueous phase obtained in the subsequent operation of regeneration of the solvent of extraction.

If washing is carried out using a nitric acid solution, its concentration is selected to be less than 1N and preferably ranging from $10^{-3}$ to $10^{-1}$N. If an aqueous solution of rare earth nitrates is used, its concentration, expressed in terms of rare earth oxide content, advantageously ranges from 5 to 500 g/l, preferably from 100 to 500 g/l.

Following the operations of extraction and subsequent washing in the separation of the aqueous phase and the organic phase, a regeneration of the solvent of extraction is carried out.

The rare earth or earths extracted into the organic phase are separated by back-extracting the organic phase with water, preferably deionized water, or with an aqueous solution of an acid, such as, for example, nitric, sulfuric, hydrochloric or perchloric acid. Preferably, nitric acid is used.

The concentration of the acid solution is selected to be less than 1N and preferably from $10^{-3}$ to $10^{31}$ $^1$N The rare earth or earths are thus transferred into the aqueous phase, while the extraction solvent may be recycled to the extraction stage. This recycling is not essential to the present invention, but is desirable for reasons of economy.

A scheme will now be described for the separation of at least two rare earths, up to n rare earths.

In the case of the separation of two rare earths symbolized by $RE_1$ and $RE_2$, the separation factor between these two rare earths is defined as the relationship between the partition coefficients of $RE_1$ and $RE_2$ $$F = P_{RE1}/P_{RE2}$$

The partition coefficient is equal to the ratio of the concentration of $RE_1$ (or $RE_2$) in the organic phase to the concentration of $RE_1$ (or $RE_2$) in the aqueous phase.

For the separation between $RE_1$ and $RE_2$ to be possible, F must be other than 1.

If $RE_1$ is the rare earth with the higher partition coefficient, in this case F is greater than 1.

According to the invention, the separation of at least two rare earths $RE_1$ and $RE_2$ by liquid/liquid extraction, comprising intimately contacting an aqueous phase containing at least the nitrates of these rare earths with an organic phase containing said organic phosphorus compound, is carried out in the following manner:

(a) in a first stage, the separation between $RE_1$ and $RE_2$ is effected by the extraction of $RE_1$ into the organic phase, with $RE_2$ essentially remaining in the aqueous phase;

(b) in a second stage, the selective washing of the organic phase containing the $RE_1$ and a minor amount of the $RE_2$ is carried out using an aqueous solution containing nitrate ions, enabling the elimination of the $RE_2$ from the organic phase by transferring same into the aqueous phase;

(c) the organic phase is then separated from the aqueous phase; and (d) in a third stage, the solvent of extraction is regenerated by contacting the organic phase with water or an aqueous acid solution.

The operating conditions for each stage are given above.

Consistent herewith, it is possible to separate a mixture of n rare earths in two subgroups by assimilating each subgroup with $RE_1$ and $RE_2$.

If a mixture of n rare earths is to be separated individually, the succession of the aforesaid three stages is repeated (n−1) times in order to separate all of the rare earths from each other.

As a practical matter, the process of the invention is carried out countercurrently, as described above. Nonetheless, it may also be conducted cocurrently or crosscurrently, as would be apparent to one skilled in this art.

The different stages of contacting may be effected in particular in conventional liquid/liquid extraction installations operating in the countercurrent mode. These installations generally comprise several stages of mixer/decantation systems or packed and/or agitated columns, arrayed such as to effect the operations of extraction, selective washing and recovery of the rare earths in the aqueous phase and the regeneration of the solvent of extraction.

In order to further illustrate the present invention and the advantages thereof, the following specific examples are given, it being understood that same are intended only as illustrative and in nowise limitative. In said examples to follow, all parts and percentages are given by weight, unless otherwise indicated.

EXAMPLE 1

Separation factor of yttrium relative to a lanthanide in a nitrate medium using a liquid mixture of phosphine oxides in an aromatic hydrocarbon (SOLVESSO 150)

The mixture of rare earths was a solution of rare earth nitrates having a concentration, expressed in terms of rare earth oxide content, of 500 g/l distributed as follows:

| (a) Ceric rare earths: | |
|---|---|
| $La_2O_3 =$ | 23.0% |
| $CeO_2 =$ | 46.5% |
| $Pr_6O_{11} =$ | 5.1% |
| $Nd_2O_3 =$ | 18.4% |
| (b) Yttric rare earths: | |
| $Sm_2O_3 =$ | 2.3% |
| $Eu_2O_3 =$ | 0.07% |
| $Gd_2O_3 =$ | 1.7% |
| $Tb_4O_7 =$ | 0.16% |
| $Dy_2O_3 =$ | 0.52% |
| $Ho_2O_3 =$ | 0.09% |
| $Er_2O_3 =$ | 0.13% |
| $Tm_2O_3 =$ | 0.013% |
| $Yb_2O_3 =$ | 0.061% |
| $Lu_2O_3 =$ | 0.006% |
| $Y_2O_3 =$ | 2.0% |

A mixture of trialkylphosphine oxides consisting of 60% tri(n-hexyl)phosphine oxide and 40% tri(n-octyl)phosphine oxide, marketed by American Cyanamid under the trademark CYANEX 923, was used as the extractant.

This extractant was dissolved in an aromatic hydrocarbon, petroleum fraction SOLVESSO 150, consisting of a mixture of alkylbenzenes, in particular dimethylethylbenzene and tetramethylbenzene at 1 mole/liter, and the resulting mixture was the extraction solvent.

The aqueous phase consisting of the solution of rare earth nitrates and the organic phase consisting of the extraction solvent were intimately contacted with each other. The volume ratio of the phases was equal to unity.

The extraction was carried out at ambient temperature.

This operation enabled determination of the separation factors $F_{Ln/y}$ for the lanthanide pairs, (Ln)/yttrium, listed in the following table:

TABLE

| Extractant | Ln | | | | | | | | | | | | | |
|---|---|---|---|---|---|---|---|---|---|---|---|---|---|---|
| | La | Ce | Pr | Nd | Sm | Eu | Gd | Tb | Dy | Ho | Er | Tm | Yb | Lu |
| Mixture of trialkyl- phosphine oxides (CYANEX 923) | 0.02 | 0.09 | 0.12 | 0.18 | 0.59 | 0.48 | 0.48 | 0.75 | 1.00 | 1.16 | 1.41 | 2.94 | 2.90 | 2.28 |

The values of the separation factors given above enable calculation of the conditions of their use to separate yttrium from the other rare earths by conventional liquid/liquid extraction methods.

It was found that the aforenoted mixture of phosphine oxides had a very good selectivity relative to yttrium for the heaviest yttric rare earths.

EXAMPLE 2

Separation factor of yttrium relative to a lanthanide in a nitrate medium using a liquid mixture of phosphine oxides in an aliphatic hydrocarbon (kerosene)

The extractant used in Example 1 was dissolved in kerosene, in a proportion of 75% by volume and the resulting mixture was the extraction solvent.

The aqueous phase, consisting of the rare earth nitrate solution described in Example 1, and the organic phase consisting of the extraction solvent, were intimately contacted with each other at 50° C. The volume ratio of the phases was equal to unity.

The following table reports the separation factors $F_{Ln/y}$ of the lanthanide pairs (Ln)/yttrium, together with the charge of the solvent of extraction at equilibrium, expressed in g of rare earth oxide per liter.

TABLE

| Extractant | Ln | | | | | | | | | | | Solvent charge g/l |
|---|---|---|---|---|---|---|---|---|---|---|---|---|
| | Nd | Sm | Eu | Gd | Tb | Dy | Ho | Er | Tm | Yb | Lu | |
| Mixture of trialkyl- phosphine oxides (CYANEX 923) | 0.35 | 0.54 | 0.73 | 0.67 | 0.94 | 1.12 | 1.31 | 1.71 | 3.1 | 1.71 | 1.93 | 98.8 |

It was noted that the mixture of phosphine oxides according to the invention was well suited for the separation of yttrium and the heaviest yttric rare earths.

EXAMPLE 3

Process for the separation of yttrium from a mixture containing thulium, ytterbium and lutecium nitrates The procedure of this example was carried out according to the embodiment of the FIGURE of Drawing.

The apparatus used for the separation of said rare earths comprised:

(i) a first liquid/liquid extraction battery having several stages, of the mixer/decanter type, which operated countercurrently and consisted of an extraction section (a) containing 36 theoretical stages, and a wash section (a') containing 14 theoretical stages; and (ii) a regeneration/recovery section of the extraction solvent (b) containing 10 theoretical stages.

The initial mixture of the rare earths to be separated was a solution of rare earths having an acidity of 0.1N and a concentration, expressed in terms of rare earth oxide content, of 270 g/l, distributed in the following manner:

| | |
|---|---|
| Yttrium oxide = | 95.0% |
| Thulium oxide = | 0.8% |
| Ytterbium oxide = | 3.8% |
| Lutecium oxide = | 0.4% |

The extractant was the mixture of trialkylphosphine oxides (CYANEX 923) of Example 1.

The extractant was dissolved in kerosene in a proportion of 75% by volume, and the resulting mixture was the solvent of extraction.

The following succession of operations was carried out:

(1) at the outlet of the extraction unit (a), at inlet line 1, the solution of rare earth nitrates to be separated was introduced at a flow rate of 161 l/hr;

(2) at the inlet of the extraction unit (a) via line 2, the extraction solvent was introduced at a flow rate of 2,135 l/hr;

(3) via line 5, at the outlet of the back-extraction section (b) and countercurrently to the organic phase, deionized water was introduced at a flow rate of 1,060 l/hr;

(4) at the inlet of the back-extraction section (b), via line 6, an aqueous solution of rare earth nitrates was collected, which was concentrated by evaporation until a concentration, expressed in terms of rare earth oxide content, of 450 g/l was obtained, having the following distribution: 8.0% $Y_2O_3$, 15.0% $Tm_2O_3$, 70% $Yb_2O_3$ and 7.0% $Lu_2O_3$. 5 l/hr of this solution were taken as final product unit (a') as reflux;

(5) at the inlet of the wash unit (a), via line 4, at a flow rate of 711 l/hr, an aqueous solution of high purity yttrium nitrate was collected, having a concentration, expressed as $Y_2O_3$, of 59 g/l and containing less than $10^{-4}$% of the other rare earths expressed in terms of their oxides;

(6) at the outlet of the regeneration/recovery section (b), via line 7, the purified extraction solvent was recovered (it may be recycled via line 2 back into the extraction unit (a) at the same flow rate; this recycling is not essential to the present invention, but is desirable for reasons of economy).

The process as described above enables the separation of yttrium from a mixture of rare earths with an excellent extraction yield of 99.8% and a very high purity of 9.9999%.

While the invention has been described in terms of various preferred embodiments, the skilled artisan will appreciate that various modifications, substitutions, omissions, and changes may be made without departing from the spirity thereof. Accordingly, it is intended that the scope of the present invention be limited solely by the scope of the following claims, including equivalents thereof.

What is claimed is:

1. A process for the separation of rare earth values from an aqueous solution of the nitrates of at least two rare earth elements, comprising liquid/liquid extracting such aqueous nitrate solution with a liquid organic phase capable of containing high concentrations of the rare earth values which comprises a mixture of different organophosphorus extractants having the formulae (I) and (I'):

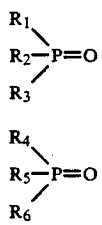

wherein formula (I), $R_1$, $R_2$ and $R_3$, which may be identical or different, are each a hydrogen atom or a substituted or unsubstituted linear or branched chain, or cyclic, saturated or unsaturated hydrocarbon radical, with the proviso that the sum of the carbon atoms of the radicals $R_1$, $R_2$ and $R_3$ is equal to at least 12 carbon atoms; and wherein formula (I'), $R_4$, $R_5$ and $R_6$, which may be identical or different, are each a hydrogen atom or a substituted or unsubstituted linear or branched chain, or cyclic, saturated or unsaturated hydrocarbon radical, also with the proviso that the sum of the number of carbon atoms of the radicals $R_4$, $R_5$ and $R_6$ is equal to at least 12 carbon atoms.

2. The process as defined by claim 1, wherein each organophosphorus extractant having the formulae (I) or (I'), each of $R_1$, $R_2$, $R_3$, $R_4$, $R_5$ and $R_6$ has from 1 to 18 carbon atoms.

3. The process as defined by claim 2, wherein each of $R_1$, $R_2$, $R_3$, $R_4$, $R_5$ and $R_6$ has from 2 to 8 carbon atoms.

4. The process as defined by claim 1, wherein each organophosphorus extractant having the formulae (I) or (I'), the total number of carbon atoms in the radicals $R_1$, $R_2$ and $R_3$ or $R_4$, $R_5$ and $R_6$ is at least 18.

5. The process as defined by claim 1, said mixture of organophosphorus extractants comprising a compound of formula (I) in which $R_1$, $R_2$ and $R_3$ are identical linear alkyl and a compound of formula (I') in which $R_4$, $R_5$ and $R_6$ are also linear alkyl radicals, but the number of carbon atoms of which differing from that of the $R_1$, $R_2$ and $R_3$ radicals.

6. The process as defined by claim 1, said mixture of organophosphorus extractants comprising a compound of formula (I) in which $R_1$, $R_2$ and $R_3$ are identical linear alkyl radicals, and a compound of formula (I') in which $R_4$, $R_5$ and $R_6$ are identical or different branched chain alkyl radicals, or a combination of linear and branched chain alkyl radicals.

7. The process as defined by claim 1, said mixture of organophosphorus extractants comprising admixture of tri(n-hexyl)phosphine oxide and tri(n-octyl)phosphine oxide, or admixture of bis(2,4,4-trimethylpentyl)n-octylphosphine oxide and tri(2,4,4-trimethylpentyl)phosphine oxide 8. The process as defined by claim 1, said aqueous solution of rare earth nitrates having a concentration, expressed as rare earth oxide content, of from 20 g/l to 500 g/l.

9. The process as defined by claim 8 said concentration in rare earth nitrates ranging from 100 g/l to 500 g/l.

10. The process as defined by claim 8, said rare earth nitrate solution having an acidity ranging from 0.01N to 3.0N.

11. The process as defined by claim 1, said organic phase including at least on organic diluent comprising an aliphatic or cycloaliphatic hydrocarbon, petroleum fraction of the kerosene type, aromatic hydrocarbon, petroleum fraction of Solvesso type, or hydrocarbon halide.

12. The process as defined by claim 1, wherein the concentration of the organophosphorus extractants in the organic phase ranges from 5% to 100% of the volume thereof.

13. The process as defined by claim 12, said concentration ranging from 50% to 100%.

14. The process as defined by claim 1, said organic phase further comprising at one alcoholic or phosphate ester modifier.

15. The process as defined by claim 14, wherein the concentration of the modifying agent in the organic phase ranges from 3% to 20% thereof.

16. The process as defined by claim 1, wherein the nitrate ion concentration at equilibrium of the aqueous phase over the course of the extraction ranges from 1 to 10 moles/liter.

17. The process as defined by claim 16, wherein said nitrate ion concentration at equilibrium ranges from 2 to 9 moles/liter.

18. The process as defined by claim 1, carried out at an extraction temperature of from 10° to 80° C.

19. The process as defined by claim 1, further comprising separating the resulting organic phase from the resulting aqueous phase, and washing said organic phase with water or an aqueous solution containing nitrate ions.

20. The process as defined by claim 19, wherein the wash solution comprises an aqueous solution of nitric acid having a concentration of less than 1N.

21. The process as defined by claim 20, wherein the concentration of the aqueous solution of nitric acid ranges from $10^{-3}$ to $10^{-1}$N.

22. The process as defined by claim 19, wherein the wash solution comprises an aqueous solution of rare earth nitrates, the concentration of which, expressed as rare earth oxide content, ranges from 5 to 500 g/l.

23. The process as defined by claim 22, wherein the concentration of the aqueous solution of the rare earth nitrates ranges from 100 to 500 g/l.

24. The process as defined by claim 19, further comprising regenerating the solvent of extraction by contacting the organic phase with water or an aqueous acid solution.

25. The process as defined by claim 24, wherein the aqueous acid solution comprises an aqueous solution of nitric, sulfuric, hydrochloric or perchloric acid.

26. The process as defined by claim 25, wherein the aqueous acid solution comprises a solution of nitric acid.

27. The process as defined by claim 25, wherein the concentration of the aqueous acid solution is less than 1N.

28. The process as defined by claim 27, wherein the concentration of the aqueous acid solution ranges from $10^{-3}$ to $10^{-1}$N.

29. A process as defined by claim 19 for the separation of at least two rare earth elements, or subgroups of rare earth elements, from each other, comprising liquid/liquid extracting an aqueous solution of the respective nitrates thereof with a liquid organic phase comprising a diluent and said mixture of organophosphorus extractants, whereby the rare earth or subgroup of rare earths having the higher partition coefficient is transferred into the organic phase, together with a minor fraction of rare earth or subgroup of rare earths having lesser partition coefficient; next selectively washing said organic phase with an aqueous solution of nitrate ions, whereby said minor fraction of rare earth or subgroup of rare earths is elinated therefrom and transferred into said wash solution; then separating the resulting organic phase from the aqueous phase; and recovering desired rare earth element or subgroup of rare earth elements from said organic phase.

30. The process as defined by claim 29, further comprising regenerating the solvent of extraction by back-extracting the organic phase with water or an aqueous acid solution.

31. The process as defined by claim 29, comprising separating yttrium values from the yttric rare earths.

32. The process as defined by claim 31, said yttrium values constituting from 5% to 80% of the total weight of the yttric rare earths, both expressed as the oxides thereof.

33. The product of the process as defined by claim 1.

34. The product of the process as defined by claim 29.

35. The process as defined by claim 1, wherein said liquid organic phase is capable of containing concentrations of rare earth values of at least 50 g/l.

36. The process as defined by claim 35, wherein said liquid phase is capable of containing concentrations of rare earth values of at least 100 g/l.

* * * * *